United States Patent [19]

Burkhardt et al.

[11] Patent Number: 4,523,367
[45] Date of Patent: Jun. 18, 1985

[54] LOCKING DEVICE FOR TOOLS IN TOOL MAGAZINES

[76] Inventors: Fritz Burkhardt, Brunnenweilerstrasse 13, D-7332 Eislingen/Fils; Otto Antel, Freibadweg 16, D-7325 Bad Boll, both of Fed. Rep. of Germany

[21] Appl. No.: 530,795

[22] Filed: Sep. 9, 1983

[51] Int. Cl.³ .............................................. B23Q 3/157
[52] U.S. Cl. ....................................... 29/568; 211/1.5
[58] Field of Search .................... 29/568, 26 A, 26 R; 414/744 R, 749; 211/1.5

[56] References Cited

U.S. PATENT DOCUMENTS

| | | | |
|---|---|---|---|
| 3,775,837 | 12/1973 | Tomita et al. | 29/568 |
| 3,845,546 | 11/1974 | Rutschke | 29/568 |
| 4,084,300 | 4/1978 | Narushima | 29/568 X |
| 4,338,709 | 7/1982 | Staub et al. | 29/568 X |
| 4,402,125 | 9/1983 | Carroll et al. | 29/568 |

FOREIGN PATENT DOCUMENTS

| | | | |
|---|---|---|---|
| 3139152 | 5/1982 | Fed. Rep. of Germany | 29/568 |
| 145201 | 11/1980 | German Democratic Rep. | 29/568 |

Primary Examiner—William R. Briggs

[57] ABSTRACT

Locking device for releasably securing tools or tool holders provided on their circumference with opposed recesses, in tool pockets open at one side, along an edge of a movable magazine means, more particularly, a rotatable magazine disc for a machine tool, with locking members which are movable into and out of the recesses in pairs, and with actuating mechanisms for the locking members, which locking members are deflectable by the actuating mechanisms with respect to the recesses transversely to the tool axis.

5 Claims, 5 Drawing Figures

LOCKING DEVICE FOR TOOLS IN TOOL MAGAZINES

The invention relates to a locking device for releasably securing tools or tool holders provided on their circumference with opposed recesses, in tool pockets open at one side, along an edge of a movable magazine means, more particularly, a rotatable magazine disc for a machine tool, with locking members which are movable into and out of the recesses in pairs, and with actuating mechanisms for the locking members.

Such a locking device is known from German Laid open paper No. 2,819,607. In the known locking device, the locking members are provided in spaced relationship at the free end of a relatively wide leaf spring which is deflectable by means of a push-rod in the axial direction of the tools or tool holders out of its position of rest, and the locking members are then axially movable out of their locking position in which they engage with the recesses on the tools or tool holders, out of these recesses into their release position. The push-rod is actuated by a stop member on the machine tool, equipped with a rotatable magazine disc, when the positioning members at the front end of a tool receptor on a work spindle have already moved forward from the rear side of the magazine disc located opposite the leaf spring into the recesses on the tools or tool holders. An important advantage of this earlier solution is that the tools are not released by the locking device until the tools have been positioned with respect to the tool receptor on the work spindle. The previously known locking device which, in itself, is advantageous, has, however, proven to be incapable of being used if at the tool or tool holder, in an axial direction in front of the recesses, there is no space available for axial deflection of the locking members.

Departing from the prior art, the object underlying the invention is therefore to provide a locking device which is also suitable for releasably securing tools or tool holders on a magazine when the recesses provided on the tools for the locking members are not freely accessible in an axial direction.

This object is attained in accordance with the invention in a locking device of the kind described at the outset by the locking members being deflectable by the actuating mechanisms with respect to the recesses transversely to the tool axis.

Since there is no deflection of the locking members in an axial direction, and only the space available at any rate in the radial direction is used, the decisive advantage of the locking device according to the invention is that tools with purely radial recesses for the locking members can be releasably secured with respect to the magazine means in the same way as tools with recesses open in an axial direction, so that the hitherto limitations with respect to the tools storable in the magazine means as regards shape of the tool shaft or the tool holder are overcome. At the same time, the advantages of the previously known locking device as regards insertion of the positioning members into the tool recesses prior to the final release of the tools by the locking device can be fully maintained.

In a locking device according to the invention with locking members prestressed into the locking position by spring means, it has proven advantageous for the locking members to be radially outwardly movable by the actuating mechanisms, against the spring prestressing force acting on them, out of their locking position into their release position. It is, furthermore, particularly advantageous for each of the locking members to be provided on one leaf spring member arranged substantially tangentially with respect to the circumference of the tool or tool holder to be secured, for with this construction, which involves low manufacturing expenditure, a relatively strong force is obtained for the locking, and the locking members can simply be formed by the inwardly bent ends of the leaf spring members. Hook-shaped locking members connected to the free ends of the leaf spring members are, however, preferred in the practical realization of the invention.

In a further construction of the invention, it has proven expedient for the actuating member in the form of a push-rod in the known locking device to be of such wedge-shaped construction that its axial motion is convertible into a radial deflecting motion of the two locking members. It has furthermore proven to be particularly advantageous for the actuating member to comprise two opposed wedgeshaped surfaces and for two levers swivable in opposite directions by the wedge-shaped surfaces of the actuating member about axes extending parallel to the tool axis to be provided. In this way, the deflection effected by the wedge-shaped surfaces is reinforced by the lever mechanism so that the locking members can be moved sufficiently far out in a radial direction out of their locking position.

In the practical realization of such a lever mechanism, it has furthermore proven expedient for the swivable levers to comprise axially protruding drivers by means of which the leaf spring members carrying the locking members are outwardly expandable, for the axially protruding drivers in this embodiment enable the actual lever mechanism including the actuating member to be disposed in the free space behind the magazine means.

In accordance with the invention, the actuating member is furthermore preferably axially displaced by a pressure medium actuated piston/cylinder unit. This unit may be a single acting unit, with the return action of the leaf spring members on the push-rods, should the associated axial force component at the inclined surfaces be insufficient, being supplemented by a return spring for the actuating member. It is, however, also possible to use a double acting piston/cylinder unit.

Further details and advantages of the invention shall be explained subsequently with reference to drawings and/or constitute the subject matter of subclaims.

Figure 1:
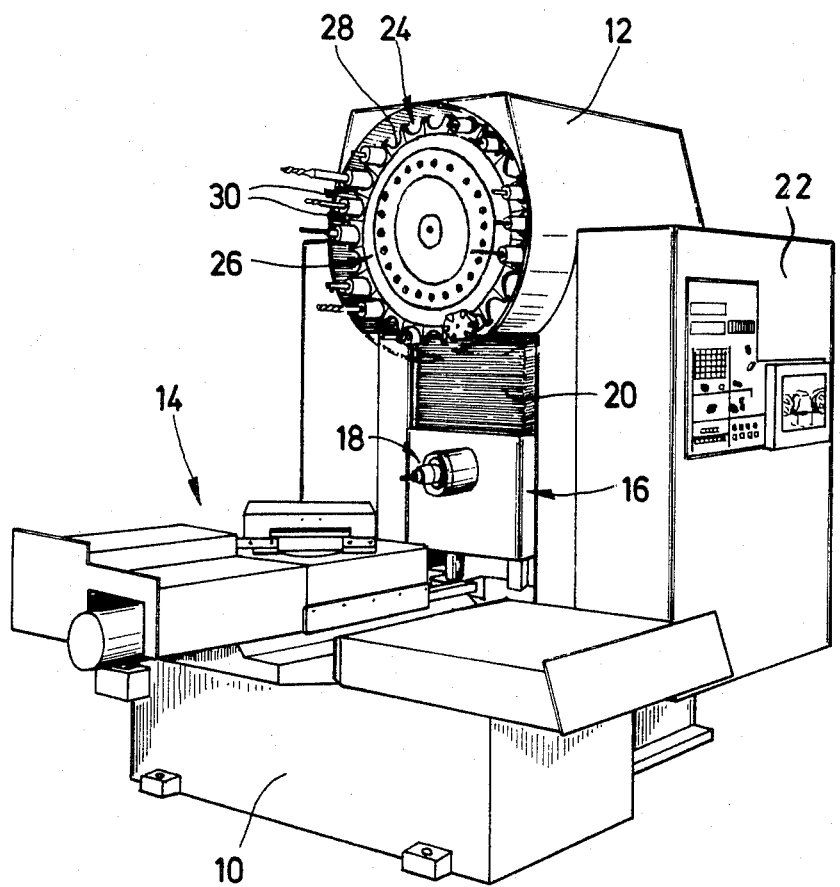
FIG. 1 is a perspective view of a machine tool with a rotatable magazine disc with associated locking devices according to the invention.

FIG. 1 shows in detail a machining centre, i.e., a machine tool comprising a machine stand 10 whose rear section supports a machine frame 12. In front of the machine frame 12, there is arranged on the machine stand 10 a machine table 14 which is preferably formed by a compound slide.

On the front of the machine frame 12, a headstock 16 with a work spindle 18 is vertically adjustably guided in a guideway which is covered above the headstock 16 by a bellows 20. A control cabinet 22 for accommodation of the machine control system, more particularly, a CNC control system is disposed at the side of the machine.

A disc-shaped magazine means, which for reasons of simplicity will be referred to subsequently as magazine 24, is arranged above the headstock 16 on the machine frame 12. The magazine 24 comprises in a manner known per se a disc-shaped tool holder support 26 which is mounted for rotation about an axis parallel to the axis of the work spindle 18 and for displacement in an axial direction. The magazine 24 is provided on its circumference with a plurality of equi-angularly spaced tool holder receptors or tool pockets 28 open in the circumferential direction, in which the various tools or tool holders 30 are releasably lockable.

Figure 2:
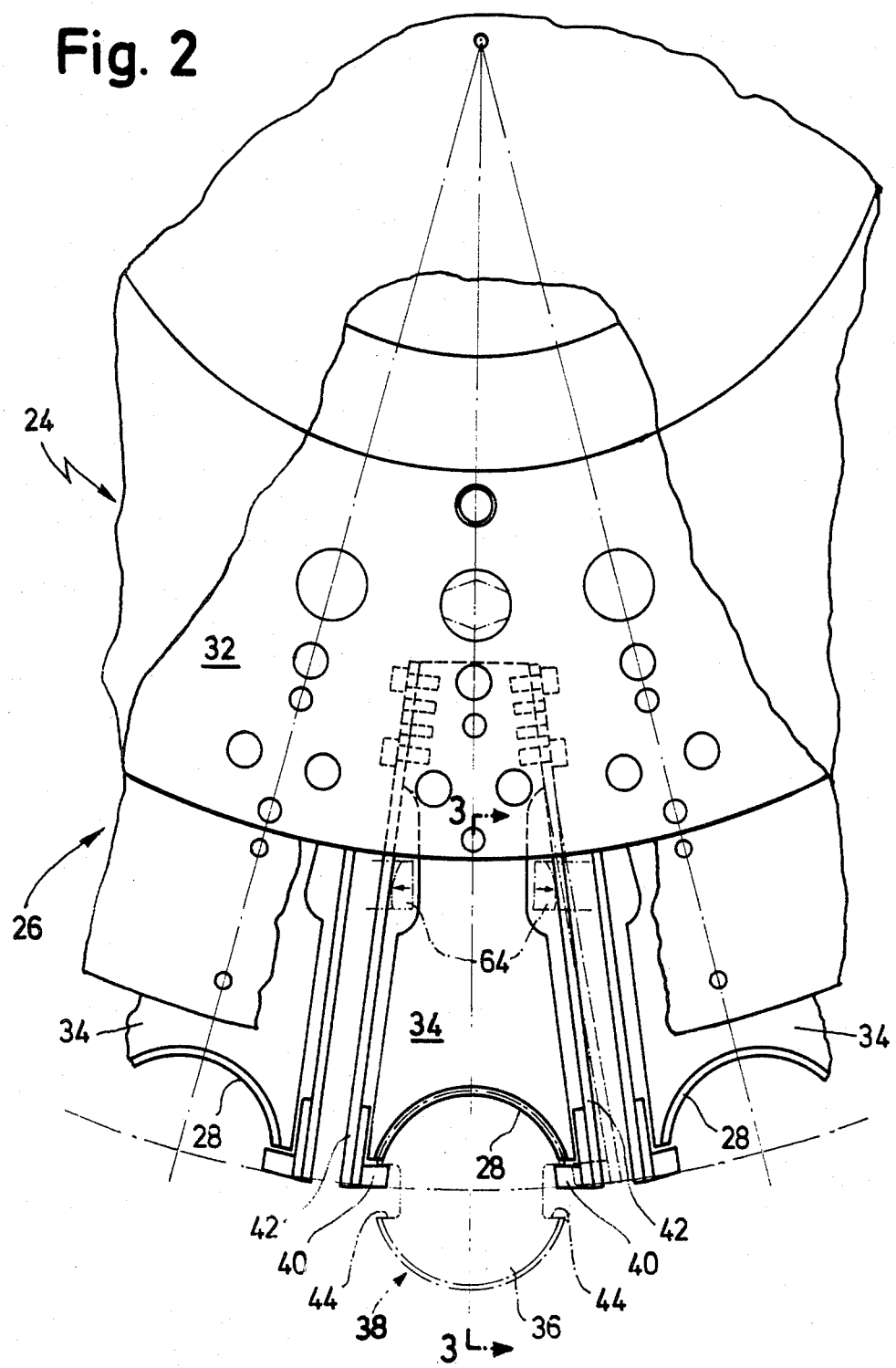
FIG. 2 is an enlarged partial top view of the magazine disc of the machine tool shown in FIG. 1 with a locking device according to the invention.

As illustrated in FIG. 2, the tool holder support 26 is composed of various discs or rings, with individual segment-shaped holding elements 34, each having a tool pocket 28 and a locking device associated with it, mounted on an outside ring 32.

Figure 3:
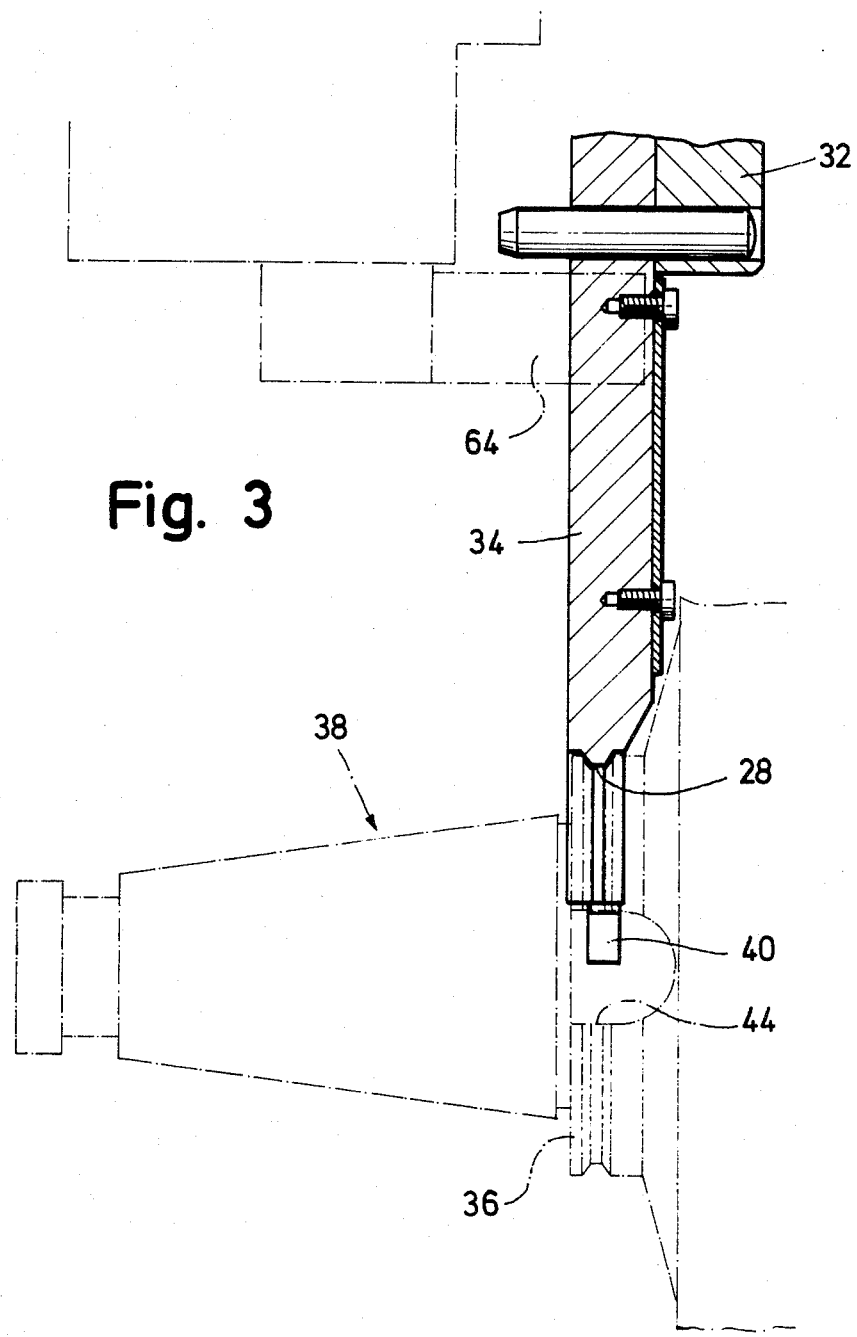
FIG. 3 is a longitudinal section through the locking device shown in FIG. 2 along the line 3—3 in this Figure.

The individual holding elements 34 of plate-shaped configuration are, for example, riveted or screwed to the outside ring 32. On their free outer end, they comprise the outwardly open tool pocket 28 whose edge profile, as is apparent from FIG. 3, is designed to be complementary to the profile of a standardized driving flange 36 of a tool holder 38. It is apparent that when the locking device is in its locking position, the tool holder 38 is axially fixed in a defined position by the profiled edge of the tool pocket 28.

As shown in FIG. 2, the locking device itself comprises two locking members 40 each of which is disposed at the free end of a leaf spring 42. The other end of the leaf springs 42 is attached, for example, by screws, to the substantially radially extending side surfaces of the holding elements 34. The locking members 40 are prestressed by the leaf springs 42 into their locking position so that they normally assume the position shown in FIG. 2 in the opposed recesses 44 of the tool holder 38 indicated in dot-and-dash lines in FIG. 2. To release this lock, each locking member 40 is movable via its pertinent leaf spring 42 by means of associated actuating mechanisms transversely to the longitudinal axis or radially out of the recesses 44 and then assumes the release position illustrated in dot-and-dash lines for the right-hand locking member 40 in FIG. 2.

The construction and function of the actuating mechanisms for the locking members 40 shall be described subsequently with reference to FIGS. 4 and 5.

Figure 5:
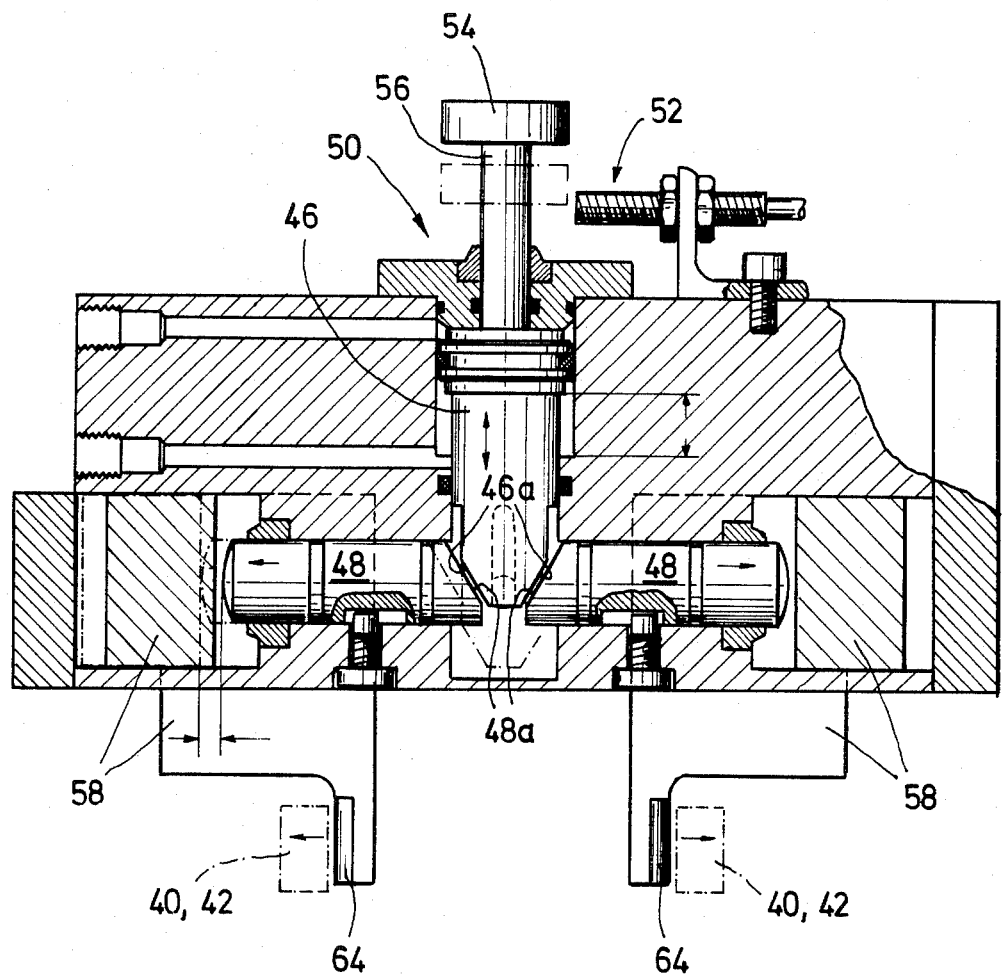
FIG. 5 is a longitudinal section through the locking device shown in FIG. 4 along the line 5—5 in this Figure.

Looking first at FIG. 5, it is apparent that the actuating mechanisms comprise an actuating member 46 which is reciprocable in a direction parallel to the longitudinal axis of tool holder 38 or parallel to the axis of rotation of the magazine 24, as indicated by a double-headed arrow in FIG. 5. At the front—in FIG. 5 lower—end of the actuating member 46 which is prevented from rotation by, for example, a wedge, two opposed wedge-shaped surfaces 46a are provided, each of which engages with an inclined surface 48a of an associated push-rod 48. Accordingly, the push-rods 48 which are also prevented in a suitable manner from rotation are pushed outwardly in opposite directions by the wedge-shaped surfaces 46a when the actuating member 46 is moved forwardly—in FIG. 5 downwardly. The actuating member 46 is driven, for example, by a pneumatic or hydraulic, double-acting piston/cylinder unit 50, which can also be used for returning the actuating member 46. In the embodiment shown, the front end position of the actuating member 46 or of the piston connected to it can be detected by a proximity switch 52 which cooperates with a head 54 on the piston rod 56 of the unit 50.

Figure 4:
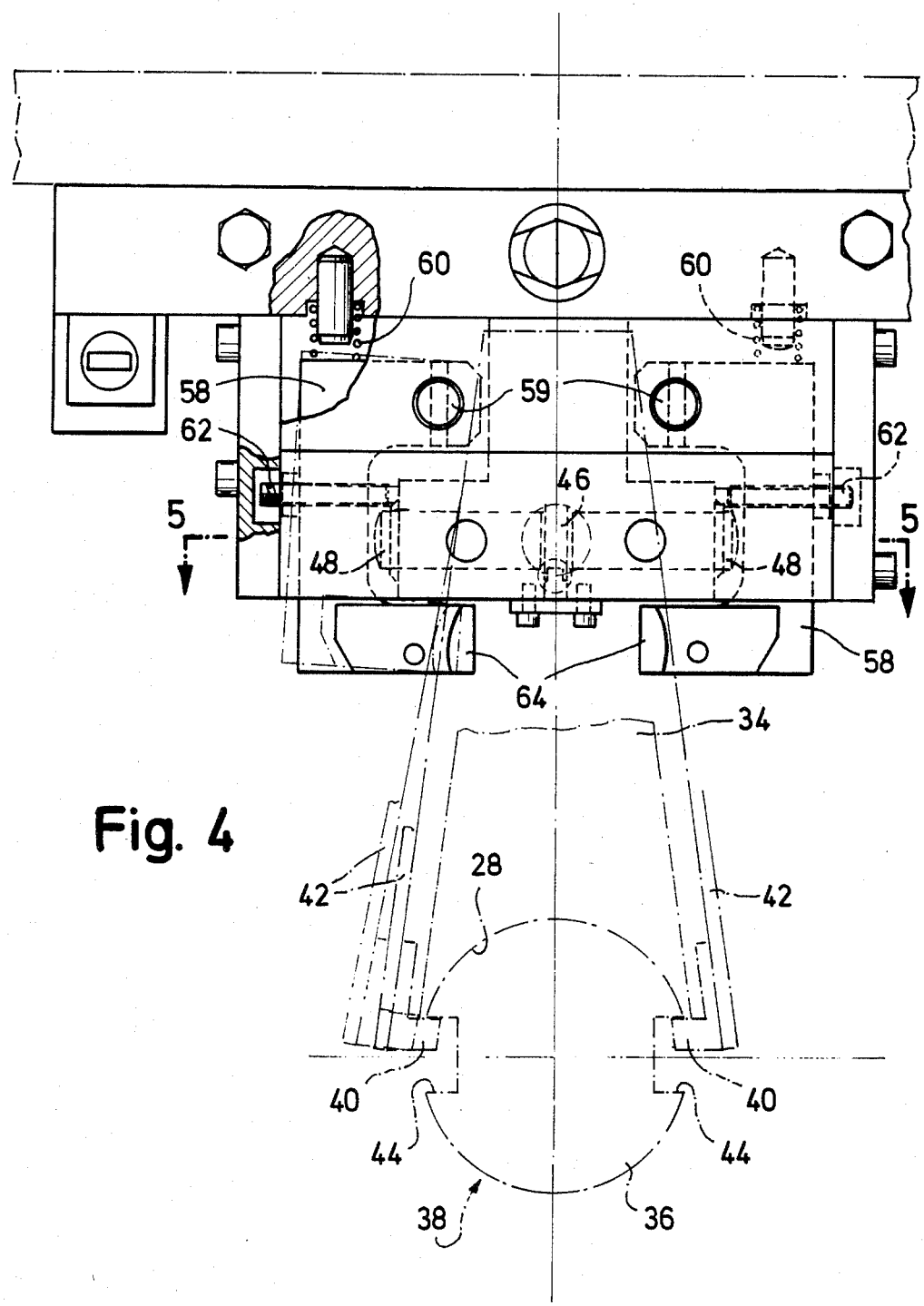
FIG. 4 is a front view of the locking device shown in FIG. 2 in a plane lying behind an outside ring and a holding element.

As shown in FIG. 4, the outer ends of the push-rods 48 each act on a central area of two levers 58 which, viewed from above, are of substantially U-shaped configuration and are swivable about axes 59 extending parallel to the magazine axis. Each of the levers 58 is prestressed by a pressure spring 60 into a defined initial position determined by a stop screw 62. The levers 58 are swivelled outwardly from their initial position shown in continuous lines in FIG. 4 to the position shown on the left in FIG. 4 in dot-and-dash lines when the actuating member 46 is moved forward in an axial direction. Drivers 64 protruding in an axial direction on the levers 58 are displaced in an outward direction and move the locking members 40 via their associated leaf springs 42 into the release position. A tool holder 38 previously locked in the tool pocket 28 is now freely movable in a downward direction out of the tool 28. Obviously, the motions of the actuating member 46 are controlled by the machine control system so as to ensure correct operational sequence when a tool is being changed, particularly when a tool holder 38 is taken over by the work spindle 18, with the positioning of the tool holder 38 by the profiled edge of the tool pocket 28 and the locking members 40 during the taking over of a tool by the work spindle 18 being maintained until the positioning members on the work spindle 18 have moved forward into the recesses 44 of the tool holder 38.

What is claimed is:

1. A locking device for releasably securing tools or tool holders provided on their circumference with opposed recesses, in tool pockets open at one side, along an edge of a rotatable magazine disc for a machine tool comprising locking members movable into and out of the recesses in pairs, leaf spring members each having an end fixed to the disc radially inwardly of the tool pockets and each having a free end radially outwardly of the tool pockets, each of the locking members being located on the free end of each of said leaf spring members, said leaf spring members arranged substantially tangentially with respect to the circumference of the tool or tool holder to be secured, and actuating means for deflecting said leaf spring members to engage and disengage said locking members.

2. In the combination of claim 1, said actuating means including a movable actuating member that is moved on an axis parallel to the longitudinal axis of the tool or tool holder, said actuating member being wedge-shaped, and means for converting axial motion of said wedge-shaped actuating member into a deflecting motion of the leaf spring members so as to position said locking members radially of the tool or tool holder.

3. In the combination of claim 2, said actuating member having two opposed wedge-shaped surfaces, said means for converting including two levers swivable in opposite directions about axes extending parallel to the tool axis by the wedge-shaped surfaces of the actuating member.

4. In the combination of claim 3, each of said swivable levers including drivers for carrying each of said leaf spring members and said locking members into a release position.

5. In the combination of claim 1, each tool pocket including a segment-shaped holding element, each of said leaf spring members of each cooperating pair of locking members being mounted on opposed side surfaces of said segment-shaped holding element, said segment-shaped holding element being the magazine disc.

* * * * *